March 10, 1970  T. R. SPECHT  3,500,195
CURRENT TRANSDUCTOR HAVING INSTANTANEOUS RESPONSE
Filed June 20, 1967
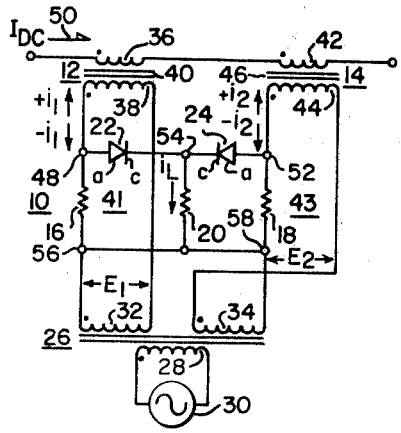
FIG. 1.
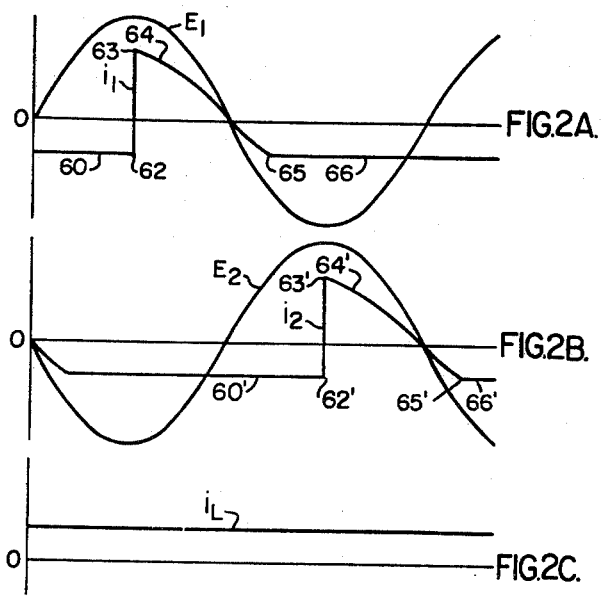
FIG. 2A.
FIG. 2B.
FIG. 2C.
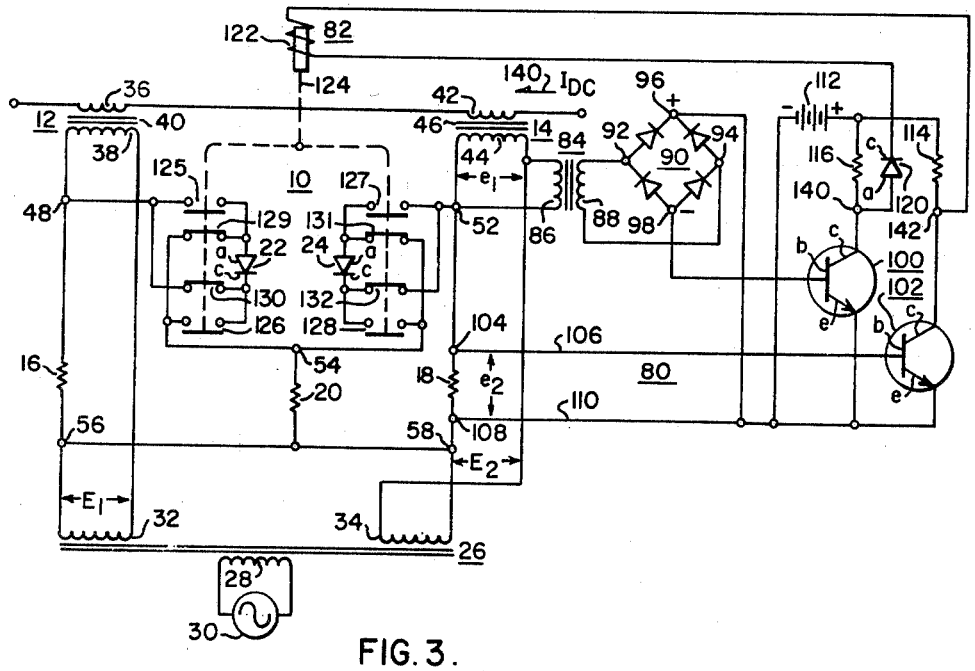
FIG. 3.
WITNESSES:
Bernard R. Gigney
James F. Young
INVENTOR
Theodore R. Specht.
BY
Donald R. Lackey
ATTORNEY

United States Patent Office 3,500,195
Patented Mar. 10, 1970

3,500,195
CURRENT TRANSDUCTOR HAVING INSTANTANEOUS RESPONSE
Theodore R. Specht, Sharon, Pa., assignor to Westinghouse Electric Corporation, Pittsburgh, Pa., a corporation of Pennsylvania
Filed June 20, 1967, Ser. No. 647,447
Int. Cl. G01r 33/00
U.S. Cl. 324—117         7 Claims

ABSTRACT OF THE DISCLOSURE

A current transductor for providing an electrical quantity responsive to the magnitude of a direct current flowing in a circuit, without metallic contact to the circuit first and second transformers, using a conductor carrying the direct current to be measured as their primary windings, have secondary windings connected through first and second impedance means to first and second sources of alternating potential, respectively, which sources are 180° out of phase. A third impedance means is connected across the first and second impedance means through first and second asymmetrically conductive means, respectively. The asymmetrically conductive means are poled to allow the greater of the voltages across the first and second impedance means to cause current flow through the third impedance means.

BACKGROUND OF THE INVENTION

Field of the invention

The invention relates to current transductors for measuring the magnitude of direct currents,

Description of the prior art

Many practical current transductors or direct current transformers for measuring the magnitude of direct current without direct metallic contact to the circuit, have been constructed, such as those described in the paper entitled "The Theory of the Current Transductor and Its Application in the Aluminum Industry" by T. R. Specht and R. N. Wagner, AIEE Transactions 1950, volume 69, pages 441–452, and in the paper entitled "New Transductor-Type D.C. Transformer Particularly Applicable to H.V. D.C. Systems," by C, Adamson and N. Hingorani, Proceedings I.E.E. volume 110, No. 4, April 1963, pages 739–750.

While prior-art current transductors have usually been suitable for their intended application, certain of the prior-art current transductors have a relatively long response time to changes in the magnitude of the direct current, which severely limits their field of application, and other current transductors of the prior-art are complicated by requiring a relatively large plurality of circuit components.

An object of this invention is to provide a current transductor which has a negligible delay in responding to changes in the direct current being measured, and a minimum number of circuit components, to not only reduce the manufacturing cost of the transductor, but to make it more reliable and easier to maintain.

SUMMARY OF THE INVENTION

Briefly, the invention requires only first and second transformers, first, second and third impedance means, first and second asymmetrically conductive means, and first and second sources of alternating potential, which are 180° out of phase. The circuit whose direct current is to be measured forms the primary windings for the first and second transformers, and their secondary windings are connected through the first and second impedance means, respectively, to the first and second sources of alternating potential, respectively, to form first and second series loops. The current in the secondary windings of the first and second transformers is responsive to the magnitude of the direct current flowing in their primary windings, except during the time the transformers are saturated. The saturation occurs only during one of the half cycles of a full voltage cycle of the source of alternating potential, for a period of time less than one half cycle. Since the first and second source potentials are 180° out of phase with one another, the voltage half cycles in which the saturation occurs in the first and second transformers are not the same. Thus, there is always a current flowing in one of the transformer secondary windings which is responsive to the magnitude of the direct current to be measured. The third impedance means is connected across the first and second impedance means through the first and second asymmetrically conductive means, respectively, with the first and second asymmetrically conductive means being poled to allow current to flow through the third impedance means only in response to the larger of the voltages, of a predetermined polarity, across the first and second impedance means. Thus, the current flowing through the third impedance means, and the voltage developed across the third impedance means, is always responsive to the magnitude of the direct current to be measured. Since the voltage across at least one of the first or the second impedance means is always responsive to the magnitude of the direct current to be measured, changes in the magnitude of the direct current to be measured are instantaneously reflected into the magnitude of the current flow through the third impedance means.

BRIEF DESCRIPTION OF THE DRAWINGS

Further advantages and uses of the invention will become more apparent when considered in view of the following detailed description and drawings, in which:

FIGURE 1 is a schematic diagram illustrating a current transductor constructed according to the teachings of the invention;

FIGS. 2A, 2B and 2C are graphs illustrating voltage and current waveforms which aid in the understanding of the invention; and FIG. 3 is a schematic diagram which illustrates how the transductor of FIG. 1 may be modified to measure the magnitude of a direct current whose direction of flow may change.

DESCRIPTION OF THE PREFERRED EMBODIMENT

Certain applications require the measurement of the magnitude of a direct current flowing in a circuit, without a direct metallic contact in the circuit, thus insulating the measuring circuit from the measured source. Further, certain applications require that the measurement be instantaneously responsive to changes in the magitude of the measured direct current. For example, in high voltage direct current transmission systems, it is important to monitor the direct current to insure that the valves in the converter are switching properly. Instantaneous response to changes in the direct current is necessary, as failure of a valve to switch properly must be detected and corrective action taken before a direct short circuit occurs in the converter.

FIG. 1 is a schematic diagram of a current transductor 10 constructed according to the teachings of the invention, which provides a measurement of the direct current flowing in a circuit, is instantaneously responsive to changes in the magnitude of the direct current, and requires a minimum of circuit components. Transductor 10 includes first and second similar transformers 12 and 14, first and second impedance means of like magnitude, such as resistors 16 and 18, a third impedance means, such as resistor 20, first and second asymmetrically conductive devices, such as semiconductor diodes 22 and 24, and first and second sources of alternating potential of like magnitude, such as provided by transformer 26, which has a primary winding 28 connected to a source 30 of alternating potential, and secondary windings 32 and 34 having a like number of turns.

Transformer 12 includes a primary winding 36 and a secondary winding 38 disposed in inductive relation with a saturable magnetic core 40, and transformer 14 includes a primary winding 42 and a secondary winding 44 disposed in inductive relation with a saturable magnetic core 46. Transformers 12 and 14 are similar, each having a predetermined turn ratio N, which is equal to the ratio of the number of turns N1 in the second winding to the number of turns N2 in the primary winding. They may be conventional current transformers with the primary windings 36 and 42 being formed by a straight through conductor in the circuit whose direct current is to be measured.

The secondary windings 38 and 44 of transformers 12 and 14 are connected to the first and second sources of alternating potential, represented by secondary windings 32 and 34, respectively, of transformer 26, through resistors 16 and 18, respectively, thus forming first and second series loops 41 and 43. Assuming that current flow into the dotted ends of primary windings 28, 36 and 42 produces the polarities indicated on the secondary windings, the dotted end of secondary winding 32 of transformer 26 is connected to the dotted end of secondary winding 38 of transformer 12, through resistor 16, and the undotted end of secondary winding 34 of transformer 26 is connected to the dotted end of secondary winding 44 of transformer 14, through resistor 18. In other words, the voltage $E_1$ applied across the secondary winding 38 by winding 32 is 180° out of phase with the voltage $E_2$ applied across secondary winding 44 by winding 34.

Resistor 20 is connected across both resistor 16 and resistor 18, through diodes 22 and 24, respectively. Diodes 22 and 24 are poled according to the direction of the direct current flow in primary windings 36 and 42. If the direct current flow is in the direction indicated by arrow 50 in FIG. 1, diode 22 should have its anode electrode $a$ connected to the junction 48 between resistor 16 and secondary winding 38, and diode 24 should have its anode electrode $a$ connected to the junction 52 between resistor 18 and secondary winding 44. The cathode electrodes $c$ of diodes 22 and 24 are connected in common at junction 54, which junction is connected to one side of resistor 20. The other side of resistor 20 is connected to the junction 56 between resistor 16 and secondary winding 32, and to the junction 58 between resistor 18 and secondary winding 34.

If the direction of the current flow is opposite to that of arrow 50, diodes 22 and 24 should be oppositely poled.

In the operation of the transductor 10 shown in FIG. 1, the voltage $E_1$ and the current $i_1$ in the first series loop, have the relationship and configuration shown in FIG. 2A. When the magnetic core 40 of transformer 12 is not saturated, the ampere turns must balance in windings 36 and 38, and thus the current $i_1$ is proportional to the direct current in the primary winding 36, according to the turn ratio N of transformer 12. In other words, if $N_1$ is equal to the turns in winding 38, $N_2$ is equal to the turns in winding 36, $i_1$ is equal to the current flow in winding 38 due to the current flow of winding 36, $i_m$ is equal to the magnetizing current flowing in winding 38, and $I_{DC}$ is equal to the direct current flowing in winding 36, the following relationship may be established:

$$(i_1+i_m)N_1=I_{DC}N_2$$

Since $i_m$ is small when magnetic core 40 is unsaturated, and since $N_1/N_2$ is equal to the turn ratio N, $i_1$ N is substantially equal to $I_{DC}$.

When the voltage $E_1$ is positive going, it reaches a magnitude at which magnetic core 40 saturates. The current $i_1$, which up to this point is negative, i.e., in the direction indicated in FIG. 1, suddenly changes direction and greatly increases its magnitude, being limited by resistor 16 and the saturated impedance of transformer 12. Thus, in FIG. 2A, portion 60 of curve $i_1$ is proportional to the magnitude of the direct current in primary winding 36, the transformer saturates at point 62, and the current increases to the magnitude at point 63, and gradually reduces along the curve 64, until coming out of saturation at point 65. The portion 66 of the curve is again proportional to the magnitude of the direct current being measured.

The voltage $E_2$ and the current $i_2$ in the series loop 43 have the relationship and configuration shown in FIG. 2B. It will be noted that the voltage $E_2$ and current $i_2$ waveforms are similar in configuration to the waveforms of voltage $E_1$ and current $i_1$, and like reference numerals with a prime mark are used to indicate the like portions of the $i_2$ curve. However, since voltage $E_2$ is selected to be 180° out of phase with voltage $E_1$, the current $i_2$ is also 180° out of phase with the current $i_1$. Thus, if the portions 64 and 64' of curves $i_1$ and $i_2$, respectively, are less than 180 electrical degrees in duration, there will always be a current flowing in one of the secondary windings 38 or 44 which will be substantially equal to the magnitude of the direct current flow to be measured.

A signal proportional to the magnitude of the direct current $I_{DC}$ is developed, according to the teachings of the invention, by diodes 22 and 24, and resistor 20. If the flow direction of the direct current to be measured is into the dotted ends of windings 36 and 42, as shown in FIG. 1, diodes 22 and 24 should be connected as shown in FIG. 1, with the anode $a$ of diode 22 being connected to junction 48, the anode $a$ of diode 24 being connected to junction 52, and their cathodes $c$ being connected in common to junction 54. Resistor 20 is connected between junction 54 and junctions 56 and 58. Thus, when the current flow $i_1$ in winding 38 is negative, flowing through resistor 16 from junction 48 to junction 56, such as in portions 60 and 66 of its curve shown in FIG. 2A, and the current flow $i_2$ is positive, flowing through resistor 18 from junction 58 to junction 52, diode 22 will be forward biased and diode 24 will be reverse biased, and current will flow through resistor 20 due to the potential across resistor 16. Both the current flow through resistor 20 and the voltage drop across resistor 20 will, therefore, be proportional to the magnitude of the direct current $I_{DC}$. When both currents $i_1$ and $i_2$ are negative, the current which is the most negative will develop the greater potential drop across its associated resistor, which will forward bias its associated diode, and the other diode will be reverse based. Thus, even when one of the currents is in the negative portion 64 or 64', the other current will be in a horizontal portion of the curve, such as portion 60 or 66, or 60' or 66', and the current flow through resistor 20 will be proportional to the magnitude of the direct current $I_{DC}$. If both currents $i_1$ and $i_2$ are exactly equal, and both diodes 22 and 24 are forward biased, the voltage across resistor 20 will be the voltage across resistor 16, or the voltage across resistor 18, since both are equal, and the current flow through resistor 20 will still be proportional to the magnitude of the direct current $I_{DC}$. FIG. 2C is a graph which illustrates that the current flow $i_L$ through resistor 20 will be a positive current of substantially constant magnitude, proportional to the negative values of currents, $i_1$ or $i_2$, and thus to the magnitude of the direct current $I_{DC}$ to be measured.

Since the voltages across resistors 16 and 18 are proportional to the instantaneous direct current flow to be measured, except when its associated transformer is saturated, any change in the magnitude of the direct current $I_{DC}$ will be immediately reflected into the magnitude of the current $i_L$ flowing through resistor 20. Thus, the disclosed arrangement has a substantially instantaneous response to changes in the magnitude of the direct current being measured.

As hereinbefore stated, the saturation times of transformers 12 and 14 must not overlap. It is desirable to make the values of resistors 16 and 18 large, in order to increase their output voltages. However, as their magnitude is increased, the width of the reverse current spike due to saturation is increased. Thus, the values of resistors 16 and 18 should be chosen to produce a saturation current which is just less than one half cycle (180 electrical degrees) at the largest magnitude of direct current which is to be accurately measured.

The output resistor 20 should not be too small, as it causes a direct current to flow in the secondary windings 38 and 44. If the direct current in the secondary windings 38 and 44 is large enough, when the current $I_{DC}$ in the primary windings 36 and 42 is zero, it will tend to self-saturate the transformers and give an erroneous output reading. In one current transductor constructed according to the teachings of the invention, the values of resistors 16 and 18 were 1.9 ohms, ans the output resistor 20 was 500 ohms, and no noticeable increase in the output voltage across resistor 20 occurred with zero direct current in primary windings 36 and 42.

When the direct current $I_{DC}$ is from a rectifier, the known polarity of the rectifier will cause a predetermined flow direction of the direct current, and the diodes 22 and 24 may be permanently connected. When the polarity of the direct source can change, however, some means must be utilized to automatically connect diodes 22 and 24 properly with respect to the direction of the direct current flow.

FIG. 3 is a schematic diagram which illustrates how the current transductor 10 of FIG. 1 may be modified to automatically measure the magnitude of a direct current, regardless of its direction of flow. Like reference numerals in FIGS. 1 and 3 indicate like components.

In general, FIG. 3 illustrates current transductor 10, and a sensing circuit 80. Sensing circuit 80 determines the direction of the current flow $I_{DC}$ in primary windings 36 and 42, providing an output signal only upon a predetermined direction of current flow. The output signal of sensing circuit 80 may be connected to a relay 82 which has a plurality of normally open and normally closed contacts. Diodes 22 and 24 may be connected into the current transductor 10 through these relay contacts, being poled such that when relay 82 is not energized they will be connected properly to normally closed contacts for the corresponding flow direction of the direct current, and when relay 82 is energized, they will be connected properly to normally open contacts which reverses their prior connections, to allow the opposite flow direction of the direct current to be measured.

More specifically, sensing circuit 80 includes means for providing a signal responsive to the voltage across one of the secondary windings, such as secondary winding 44, and means for providing a signal responsive to the voltage across the resistor associated with the secondary winding selected, which in this instance is resistor 18.

The means for providing a signal responsive to the voltage across secondary winding 44 may include a potential transformer 84 having a primary winding 86 connected across secondary winding 44, and a secondary winding 88, a single phase, full-wave bridge rectifier 90 having alternating current input terminals 92 and 94 connected to secondary winding 88 of potential transformer 84, and direct current output terminals 96 and 98, and semiconductor switching means 100, which may be a transistor of the NPN junction type, having base, collector and emitter electrodes $b$, $c$ and $e$, respectively.

The means for providing a signal responsive to the voltage across resistor 18 may include semiconductor switching means 102, which may also be a transistor of the NPN junction type having base, collector and emitter electrodes $b$, $c$ and $e$, respectively. The base and emitter electrodes $b$ and $e$ of transistor 102 are connected across resistor 18, with the base electrode $b$ being connected to junction 104 between resistor 18 and winding 44 via conductor 106, and the emitter electrode $e$ being connected to the junction 108 between resistor 18 and winding 34 via conductor 110. The collector electrode $c$ of transistor 102 is connected to the positive terminal of a source of direct current potential, such as battery 112, through a current limiting resistor 114, and the negative terminal of battery 112 is connected to conductor 110.

The collector electrode $c$ of transistor 100 is connected to the positive terminal of battery 112 through a current limiting resistor 116, and its emitter electrode $e$ is connected to conductor 110. The output of rectifier 90 is connected across the base and emitter electrodes $b$ and $e$, of transistor 100, with the negative terminal 98 being connected to the base electrode $b$, and the positive terminal 96 being connected to the emitter electrode $e$.

The output of the sensing circuit 80 appears across the collector electrodes $c$ of transistors 100 and 102 at junctions 140 and 142, with a diode 120 being connected to the collector electrode of transistor 100. Diode 120 is poled such that its anode electrode $a$ is connected to junction 140. A suitable switching means, such as relay 82 may be connected to be responsive to the output of sensing circuit 80. Relay 82 has an electromagnetic coil 122 connected to the cathode electrode $c$ of diode 120, and to junction 142. Relay 82 has a plurality of normally open contacts 125, 126, 127 and 128, and a plurality of normally closed contacts 129, 130, 131 and 132, which are responsive to relay 82, as indicated by dotted line 124. When relay 82 is de-energized, diode 22 is connected between junctions 48 and 54 via normally closed contacts 130 and 129, which connect the cathode $c$ of diode 22 to junction 48 and its anode $a$ to junction 54. When relay 82 is energized, diode 22 is connected between junctions 48 and 54 via normally open contacts 125 and 126, which connect the anode $a$ of diode 22 to junction 48 and its cathode $c$ to junction 54.

In like manner, when relay 82 is de-energized diode 24 is connected between junctions 52 and 54 via normally closed contacts 132 and 131, which connect the cathode $c$ of diode 24 to junction 52 and its anode $a$ to junction 54. When relay 82 is energized, diode 24 is connected between junctions 52 and 54 via normally open contacts 127 and 128, which connect the anode $a$ of diode 24 to junction 52 and its cathode $c$ to junction 54.

In the operation of the current transductor 10 and sensing circuit 80 shown in FIG. 3, it will first be assumed that the direction of direct current flow through primary windings 42 and 36 is in the direction shown by arrow 140 in FIG. 3. This is the opposite direction to that shown in FIG. 1, so diodes 22 and 24 should be poled oppositely to their positions of FIG. 1. According to the hereinbefore described connection of diodes 22 and 24 to the relay contacts, relay 82 should be de-energized when current flow is in the direction of arrow 140.

If transformer 14 is not saturated, a voltage $e_1$ will appear across winding 44 of transformer 14, which will be rectified by rectifier 90. Transistor 100 will therefore be reverse biased, and non-conducting. The positive terminal of battery 112 will effectively be connected to junction 140. The direction of the current flow through resistor 18 will be from junction 108 to junction 104, which reverse biases transistor 102, causing it to be non-conducting, and the positive terminal of battery 112 will also be effectively connected to junction 142. Since junctions 140 and 142 are at the same potential, relay 82 will not receive an output signal while transformer 14 is not saturated. If transformer 14 is saturated, the voltage $e_1$ across winding 44 will be substantially zero, and transistor 100 will switch to its conductive condition, junction 140 will be effectively connected to conductor 110, and there will be no output from sensing means 80, regardless of the magnitude or polarity of voltage $e_2$ as diode 120 will block any current flow when there is a potential difference between junctions 140 and 142. Thus, when the direction of the direct current to be measured is as indicated by arrow 140 in FIG. 3, relay 82 will not receive a signal, either during the time transformer 14 is saturated, or when it is unsaturated, and relay 82 will be de-energized. Since diodes 22 and 24 are connected to the normally closed contacts of relay 82, as hereinbefore described, they are in the proper poled direction, relative to the direction of the direct current flow to be measured.

Now, assume that the direction of the direct current $I_{DC}$ to be measured changes its flow direction, and is the same as indicated by arrow 50 in FIG. 1, and opposite to that indicated by arrow 140 in FIG. 3. When transformer 14 is saturated, the voltage $e_1$ across winding 44 will be substantially zero, and there will be no output from sensing circuit 80 as hereinbefore described, due to the action of diode 120. When transformer 14 is not saturated, however, the voltage $e_1$ will reverse bias transistor 100, causing it to be non-conductive, and the positive terminal of battery 112 will be effectively connected to junction 140. With direct current flowing in the direction opposite to arrow 140, the current flow through resistor 18 will be from junction 104 to junction 108, and transistor 102 will be forward biased, switching it to its conductive condition. Thus, junction 142 will be effectively connected to the negative terminal of battery 112, and the battery voltage will appear across junctions 140 and 142. Diode 120 is poled to allow current flow when junction 140 is more positive than junction 142, and relay 82 will be energized. Relay 82 is thus energized with a pulsating direct current, when the direct current to be measured is flowing in the direction indicated by arrow 50 in FIG. 1, with current flowing each cycle of the source 30 while transformer 14 is unsaturated. This pulsating direct current may be smoothed if desired, by a wave filter (not shown), in a manner well known in the art. When relay 82 is energized, its normally open contacts will connect diodes 22 and 24, as shown in FIG. 1, to properly pole them with respect to the changed direction of current flow.

In summary, there has been disclosed a new and improved current transducer which has a substantially instantaneous response to changes in the magnitude of the direct current to be measured, making it suitable for use in monitoring the switching of a converter in a high voltage direct current transmission system, and any other application which requires a fast response time. Further, this has been accomplished without unnecessarily complicating the current transductor, requiring only two current transformers, two sources of alternating potential which are 180° out of phase with one another, three resistors, and two diodes. Thus, the manufacturing cost of the current transductor is competitive with the slower response time current transductors of the prior art, as well as providing a current transductor having a high degree of reliability. Still further, there has been disclosed a new and improved current transductor which will automatically measure the magnitude of a direct current, regardless of its direction of flow, which embodiment may be used in those applications in which the direction of current flow may change. This modified current transductor is similar in construction and operation to the basic current transductor disclosed, requiring a sensing circuit which will provide an output signal only when the current flow to be measured is in a predetermined direction, and a relay to reverse the connections of the two diodes in the circuit.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A current transducer for measuring the magnitude of direct current flow in a circuit, comprising:
   first and second electrical transformers each having primary and secondary windings,
   first and second sources of alternating potential which are 180° out of phase,
   first, second and third impedance means,
   first and second asymmetrically conductive means,
   the secondary winding of said first transformer, said first impedance means, and said first source of alternating potential being connected to form a first series A.C. loop,
   the secondary winding of said second transformer, said second impedance means, and said second source of alternating potential being connected to form a second series A.C. loop,
   the primary windings of said first and second transformers being adapted for series connection in the circuit whose direct current is to be measured,
   said third impedance means being connected across said first and second impedance means through said first and second asymmetrically conductive means, respectively, with said first and second asymmetrically conductive means being pole to allow current flow through said third impedance means in response to the larger of the potentials of a predetermined polarity across said first and second impedance means.

2. The current transducer of claim 1 wherein the values of said first and second impedance means are substantially the same, and are selected to provide a suitable signal voltage at the lowest direct current magnitude to be measured, without saturating said first and second transformers for more than 180 electrical degrees of the source of alternating potential at the largest magnitude of direct current to be measured.

3. The current transductor of claim 1 wherein the value of said third impedance means is selected to limit the magnitude of the direct current circulating in said first and second series loops, to within the value necessary to prevent self-saturation of said first and second transformers when the magnitude of the direct current to be measured is zero.

4. The current transductor of claim 1 including means for poling said asymmetrically conductive means in a predetermined manner when the direct current to be measured is flowing in a first direction, and reversing the poling of said asymmetrically conductive means when the direction of the direct current to be measured is opposite to said first direction.

5. The current transductor of claim 1 wherein said first and second sources of alternating potential are provided by a transformer having a primary winding adapted for connection to a source of alternating potential, and first and second secondary windings, said first, second and third impedance means are resistors, and said first and second asymmetrically conductive means are diodes.

6. The current transductor of claim 1 wherein said first and second transformers are current transformers, in which their primary windings are a conductor from the circuit whose direct current is to be measured.

7. The current transductor of claim 1 including sensing means responsive to the voltage across the secondary winding of one of said first and second series loops, and to the voltage across the impedance means of the same series loop, and means responsive to said sensing means for poling said asymmetrically conductive means according to the direction of the flow of the direct current to be measured.

References Cited

UNITED STATES PATENTS

| | | | |
|---|---|---|---|
| 2,497,961 | 2/1950 | Shaw | 324—131 XR |
| 2,745,056 | 5/1956 | Zucchino | 323—89 XR |
| 2,835,875 | 5/1958 | Kramer | 324—117 XR |
| 3,122,700 | 2/1964 | Gabriel et al. | 323—89 |
| 3,135,911 | 6/1964 | Van Allen | 324—117 XR |
| 3,302,122 | 1/1967 | Dortort et al. | 330—8 |

ARCHIE R. BORCHELT, Primary Examiner

E. F. KARLSEN, Assistant Examiner

U.S. Cl. X.R.

324—127